(12) United States Patent
Patil

(10) Patent No.: US 11,979,799 B1
(45) Date of Patent: May 7, 2024

(54) SYSTEM, METHOD, AND COMPUTER PROGRAM FOR DYNAMIC CHARGE COMPUTATION

(71) Applicant: Amdocs Development Limited, Limassol (CY)

(72) Inventor: Nitin Kishor Patil, Pune (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 421 days.

(21) Appl. No.: 17/016,119

(22) Filed: Sep. 9, 2020

(51) Int. Cl.
*H04W 4/24* (2018.01)
*H04M 15/00* (2006.01)

(52) U.S. Cl.
CPC .............. *H04W 4/24* (2013.01); *H04M 15/44* (2013.01); *H04M 15/51* (2013.01); *H04M 15/58* (2013.01); *H04M 2215/54* (2013.01)

(58) Field of Classification Search
CPC ...... H04M 15/00; H04M 15/80; H04M 15/43; H04M 15/51; H04M 15/58; H04M 15/66; H04M 15/745; H04M 15/88; H04M 15/44; H04M 15/765; H04M 15/8083; H04M 17/00; H04M 2215/0104; H04M 2215/724; H04M 15/81; H04M 15/852; H04M 2215/0108; H04M 2215/0152; H04M 2215/016; H04M 2215/0168; H04M 2215/72; H04M 15/49; H04M 15/7652; H04M 15/775; H04M 15/78; H04M 15/785; H04M 15/8044; H04M 15/8016; H04M 15/85; H04M 15/857; H04M 2215/70; H04M 2215/7281; H04M 2215/7295; H04M 2215/745; H04M 15/09; H04M 2215/0184; H04M 15/46; H04M 15/59; H04M 15/61; H04M 15/62; H04M 15/64; H04M 15/65; H04M 15/77; H04M 15/8022; H04M 15/772; H04M 15/8055; H04M 3/42153; H04M 15/30; H04M 15/41; H04M 2215/7009; H04M 2215/7263; G06Q 30/04; G06Q 20/102; G06Q 20/14; G06Q 20/28; G06Q 20/24; G06Q 40/12; G06Q 20/04; G06Q 20/405; G06Q 20/401; G06Q 30/0269; H04W 4/24
See application file for complete search history.

(56) References Cited

U.S. PATENT DOCUMENTS

| 2003/0086536 | A1* | 5/2003 | Salzberg | H04M 3/2263 |
| | | | | 379/26.01 |
| 2003/0233321 | A1 | 12/2003 | Scolini et al. | |
| 2011/0040704 | A1* | 2/2011 | Ekker | G06Q 30/06 |
| | | | | 705/400 |

(Continued)

FOREIGN PATENT DOCUMENTS

| CA | 2809841 A1 * | 5/2013 | ........ H04M 1/72577 |
| WO | WO-2012047932 A2 * | 4/2012 | ............. G06F 15/16 |

*Primary Examiner* — Srilakshmi K Kumar
*Assistant Examiner* — Jing Gao
(74) *Attorney, Agent, or Firm* — Zilka-Kotab, P.C.

(57) ABSTRACT

As described herein, a system, method, and computer program are provided for dynamic charge computation. In use, a change made to a subscription of a customer is detected, wherein the subscription is associated with a billing cycle. Further, responsive to detecting the change and prior to an end of the billing cycle, at least one charge is computed for the subscription.

17 Claims, 7 Drawing Sheets

(56) References Cited

U.S. PATENT DOCUMENTS

2012/0059748 A1* 3/2012 Matsuo ................ G06Q 30/04
  705/34
2015/0127531 A1  5/2015 Dimmler et al.
2018/0158035 A1  6/2018 Kaufmann et al.
2020/0160438 A1  5/2020 Melling et al.

* cited by examiner

SYSTEM, METHOD, AND COMPUTER PROGRAM FOR DYNAMIC CHARGE COMPUTATION

FIELD OF THE INVENTION

The present invention relates to computing charges for a billing cycle.

BACKGROUND

Typically, subscribers to a service will be billed according to a billing cycle. The billing cycle accumulates charge-related events over a period of time (i.e. during the cycle), and then computes the charges for those events at the completion of the billing cycle to generate a bill for the subscriber. To accommodate the end-of-cycle computations required for a large number of subscribers, businesses may utilize multiple different billing cycles (with different start/end dates) for their customers.

However, there are still various drawbacks to performing the charge computations at the completion of a billing cycle. For example, each billing cycle may still cover numerous customers, such that the end-of-cycle computations continue to place a peak load on the billing system at the end of each cycle. In addition, any bill verifications cannot be performed until the computations are completed at the end of the cycle, again causing some peak load on the billing system, delaying those verifications, and delaying any fixes for identified errors. Further, when any billing cycles do not coincide with the end of the month, unbilled revenue may be required to be reported at the end of each month which also causes some peak load on the billing system at the end of the month when the unbilled revenue is being computed.

There is thus a need for addressing these and/or other issues associated with the prior art.

SUMMARY

As described herein, a system, method, and computer program are provided for dynamic charge computation. In use, a change made to a subscription of a customer is detected, wherein the subscription is associated with a billing cycle. Further, responsive to detecting the change and prior to an end of the billing cycle, at least one charge is computed for the subscription.

DETAILED DESCRIPTION

Figure 1:
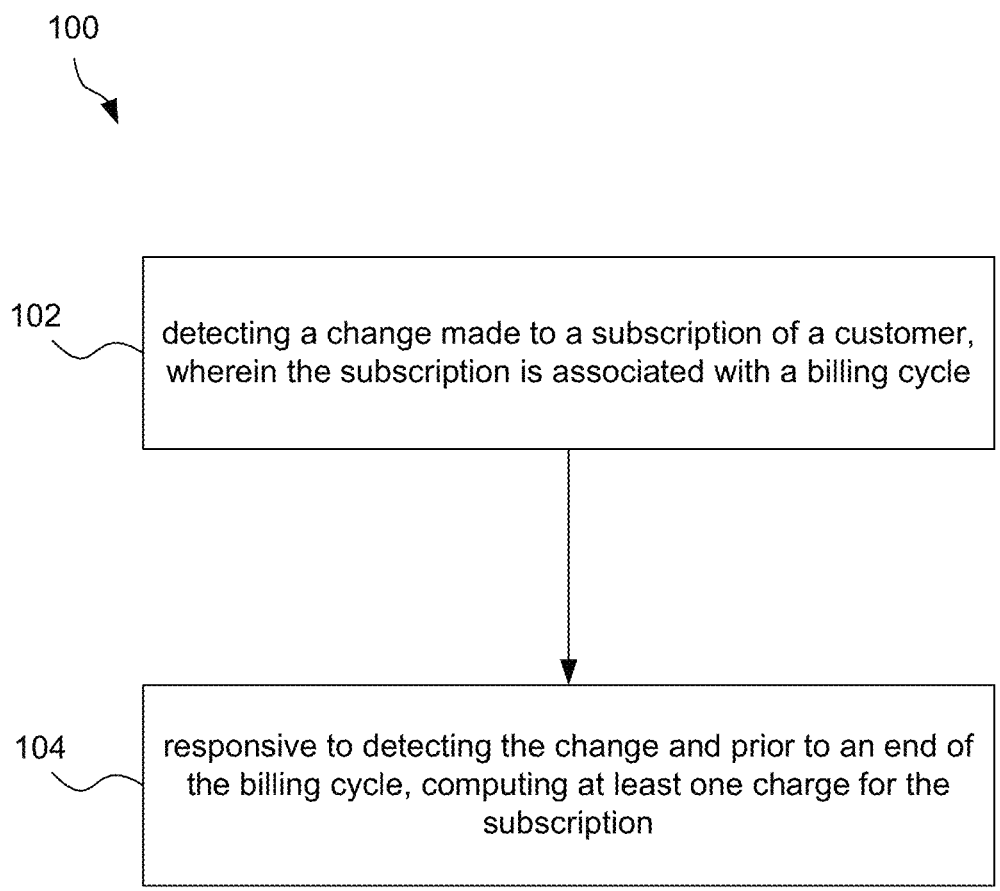
FIG. 1 illustrates a method for dynamic charge computation, in accordance with one embodiment.

FIG. 1 illustrates a method 100 for dynamic charge computation, in accordance with one embodiment. The method 100 may be performed by a computer system (e.g. server), such as that described below with reference to FIGS. 6 and/or 7. For example, the method 100 may be performed by the computer system (e.g. a billing system) of a service provider, such as a communication service provider (CSP), in one embodiment. The service provider may provide one or more services to which customers subscribe, such as communication services (e.g. wireless, fixed home phone, broadband, etc.) as well as television and media streaming services.

In operation 102, a change made to a subscription of a customer is detected, wherein the subscription is associated with a billing cycle. As noted above, the subscription may be to a service of a service provider. To this end, the subscription is an agreement of the customer with the service provider to make some payment in exchange for use of the service. The subscription may be created (i.e. in the computer system) upon acceptance by the customer of an offer from the service provider, where the offer is to allow customer use of the service in exchange for a fee paid by the customer.

As noted above, the subscription is associated with a billing cycle. Thus, the required payment may be recurring. The billing cycle may be a monthly cycle, in one embodiment, with any corresponding start and end dates during the month. It should be noted that the billing cycle may not necessarily start at the beginning of the month and end at the end of the month.

In one embodiment, a system utilized for managing customer subscriptions may be monitored for detecting the change. For example, the system may be monitored for only certain types of changes that affect charges computed for the subscription. The change may be made automatically (e.g. based on a change made to an offer in a catalog of the service provider) or manually (e.g. based on input from the customer). In various embodiments, the change may include an addition of an offer to the subscription, a modification of an offer associated with the subscription, a deletion of an offer associated with the subscription, a modification to one or more customer parameters included in the subscription, etc.

In operation 104, responsive to detecting the change and prior to an end of the billing cycle, at least one charge is computed for the subscription. The charge may correspond with the change made to the subscription, and includes a fee to be included on a bill for the subscription. For example, the charge may include adding a charge for the subscription when the change is an addition of an offer to the subscription. As another example, the charge may include modifying an existing charge for an offer associated with the subscription. As another example, the charge may include reducing or removing an existing charge for a deletion of an offer associated with the subscription. Of course, it should be noted that the charge may be computed according to any algorithm predefined for the particular change made to the subscription.

To this end, charges for a subscription may be computed dynamically (e.g. in real-time) upon detection of a relevant change made to the subscription. It should be noted that the method 100 may be repeated for a plurality of (e.g. all) subscriptions of a plurality of (e.g. all) customers. These subscriptions may be associated with a plurality of different billing cycles (i.e. with different start/end dates), such that the method 100 may be repeated for the subscriptions regardless of the billing cycle.

By dynamically computing charges as changes are made, as described above in method 100, peak load otherwise caused by end-of-cycle charge computations may be avoided. Further, peak load caused by verification of end-of-cycle computations may also be avoided, and further verifications and fixes for identified errors may be provided dynamically as the changes are made. Still yet, unbilled revenue may be dynamically adjusted based on the computed charges, also avoiding peak load caused by end-of-cycle calculation of unbilled revenue.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
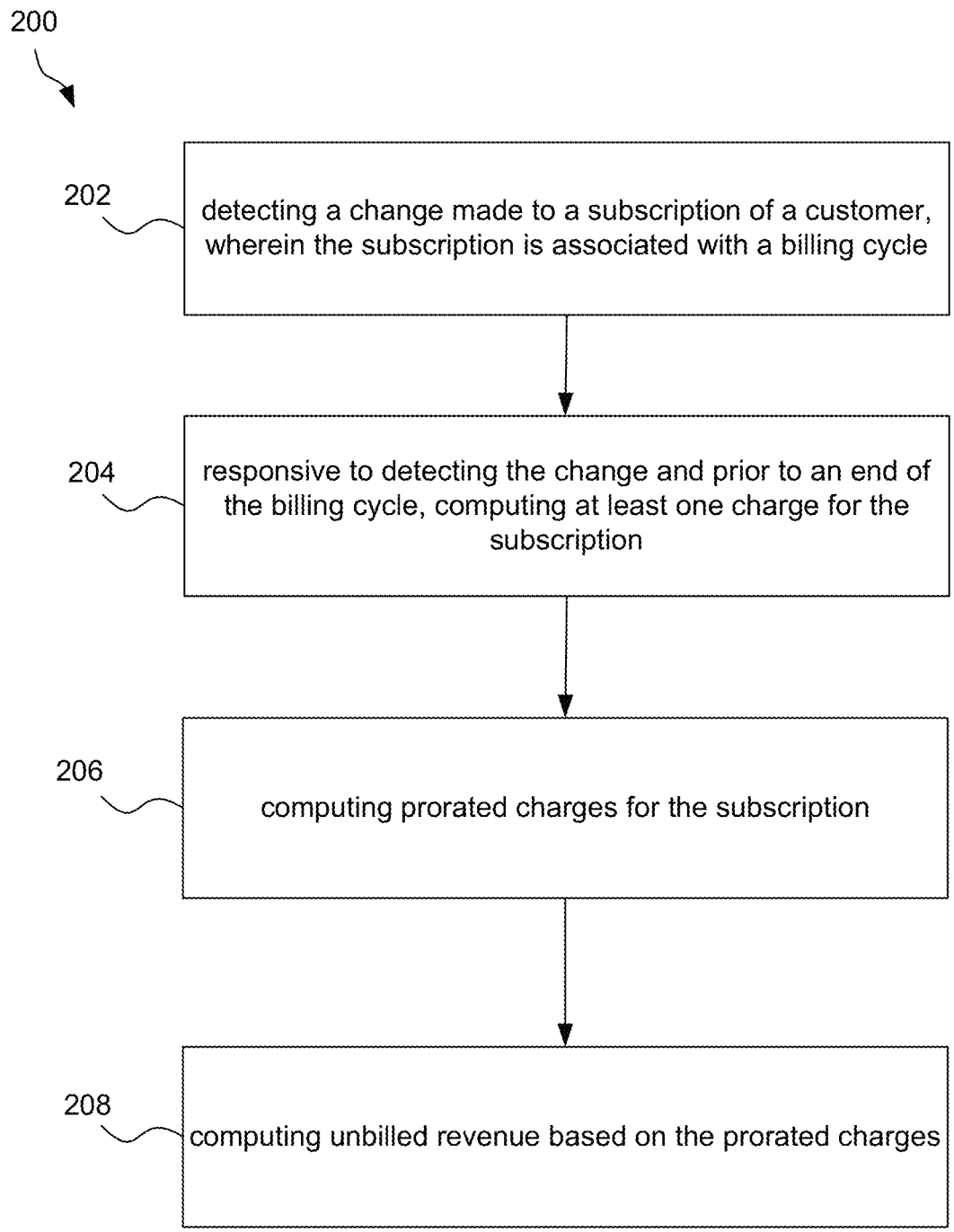
FIG. 2 illustrates a method for determining unbilled revenue using dynamic charge computations, in accordance with one embodiment.

FIG. 2 illustrates a method 200 for determining unbilled revenue using dynamic charge computations, in accordance with one embodiment. As an option, the method 200 may be carried out in the context of the details of the previous figure and/or any subsequent figure(s). Of course, however, the method 200 may be carried out in the context of any desired environment. Further, the aforementioned definitions may equally apply to the description below.

In the financial world, organizations are expected to report revenue which is "unbilled" at the end of each calendar month. "Unbilled" revenue refers to revenue that potentially has already been earned but has not yet been billed to the customer, such as revenue expected to be earned as part of a subscription (e.g. monthly subscription) but not yet billed at any date prior to the end of the customer's billing cycle.

In prior art billing systems, customer charges are computed only at the end of the customer's billing cycle. As a result, generating an "unbilled" revenue report requires performing the charges computation for all post-paid customers at the end of the billing cycle and then computing the prorated charges up until the end of calendar month. This is a very resource consuming process and has potential to impact the regular operations of the system.

The present method 200 provides dynamic charge computations for use in determining unbilled revenue, to avoid the end-of-cycle peak load caused by performing the charges computation and the prorated charges together at the end of the billing cycle. In operation 202, a change made to a subscription of a customer is detected, wherein the subscription is associated with a billing cycle. Then, in operation 204, responsive to detecting the change and prior to an end of the billing cycle, at least one charge is computed for the subscription.

Further, in operation 206, prorated charges are computed for the subscription. Thus, the prorated charges may be computed for the subscription responsive to detecting the change. As a result, the prorated charges may be dynamically computed for each change effecting revenue. In the present embodiment, the prorated charges refer to charges expected from a current date through an end of a current calendar month. The prorated charges represent a portion of the unbilled revenue that corresponds to the subscription.

Still yet, in operation 208, unbilled revenue is computed based on the prorated charges. Operation 208 may be performed at the end of the calendar month, when unbilled revenue must be reported. In one embodiment, the unbilled revenue may be computed by combining the prorated charges of the subscription with prorated charges computed for other customer subscriptions (similarly using operations 202-206). The other customer subscriptions may refer to those across all billing cycles. In this way, unbilled revenue may be computed at the end of the calendar month, as required, without also having to compute prorated charges for all subscriptions at the end of the calendar month.

Figure 3:
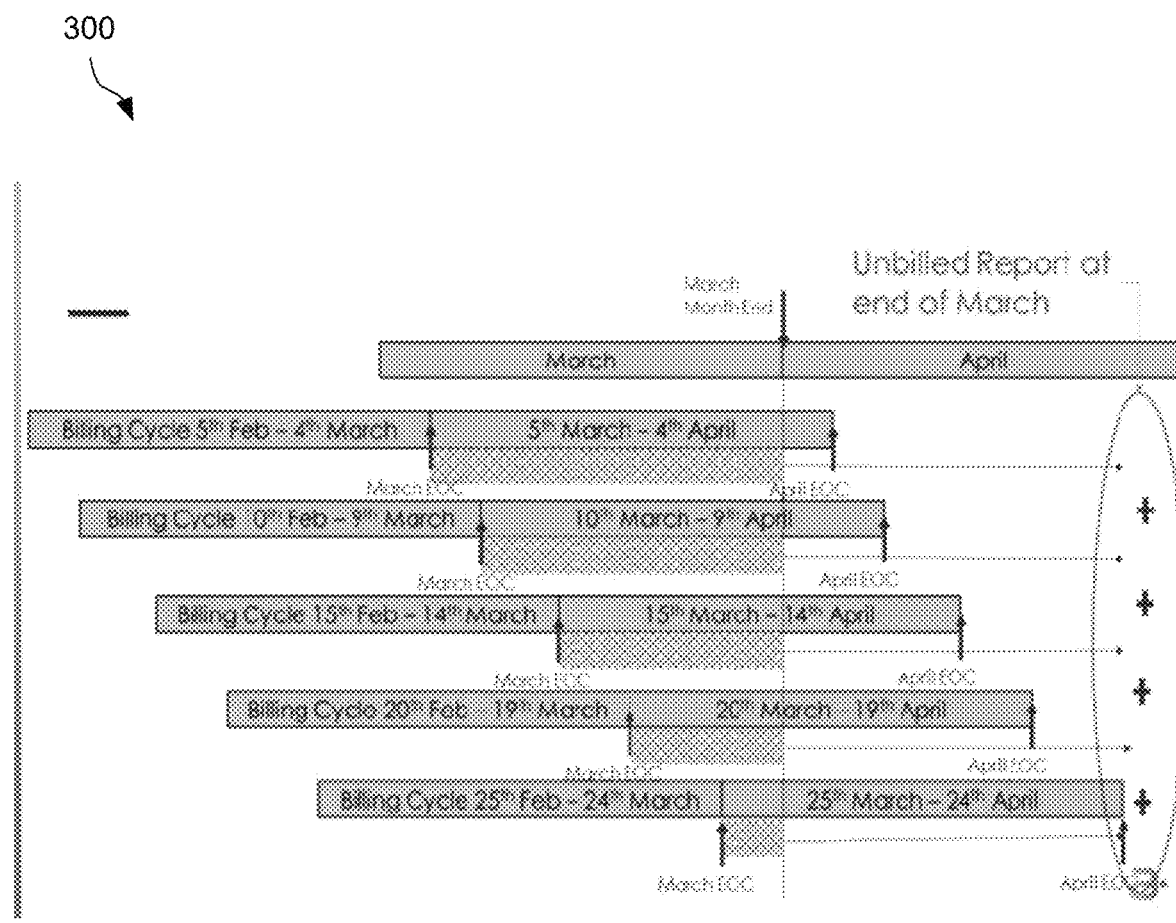
FIG. 3 illustrates a timeline for various billing cycles having unbilled revenue, in accordance with one embodiment.

FIG. 3 illustrates a timeline 300 for various billing cycles having unbilled revenue, in accordance with one embodiment. As an option, the timeline 300 is an example showing the unbilled revenue determined using the method 200 of FIG. 2.

In the timeline 300 shown, there are 5 billing cycles at a CSP. In accordance with the prior art, to generate the unbilled revenue report for the month of March, the CSP has to run the charge computations on March 31st for all 5 billing cycles. For a CSP with a large number of customers, this is a very high volume of computations on a single day and demands a huge amount of computing resources. Moreover, at a typical CSP there are 30 billing cycles, and further the last cycle computation also must complete on the same day.

As described with respect to the method 200 of FIG. 2, the capability to compute charges whenever there is any change in the system can be leveraged for computing unbilled revenue. In particular, charges are computed in real time for all customers. These charges are computed up until the end of the billing cycle, moreover they are computed whenever there is any change in the system (which means in real time). This capability may be enhanced to also compute the charges prorated up until the end of the current calendar month and to then publish them for use in reporting unbilled revenue (e.g. published to to a dedicated Kafka topic).

The billing system may subscribe to all such change events (e.g. occurring in a subscription management system) and may accumulate the charges for a specific calendar month end for all customer subscriptions. Since the charges for any add, modify or delete operations are computed dynamically, month end prorated charges may also be computed for change. This process allows the prorated charges to be dynamically computed (per change) up until the end of the calendar month for all subscriptions in the system.

Thus, at the end of the calendar month the billing system just needs to accumulate over all such prorated charges (up until the end of calendar month) to build a consolidated view of all of the unbilled charges constituting the unbilled revenue for the CSP. With this process, the unbilled charges can be computed at a much lower computation cost (negligible computation overhead) and almost within few hours of closing of the calendar month. Accordingly, this process will significantly reduce the computation resource cost, increase accuracy, as well as reduce the computation window for unbilled financial reporting.

Figure 4:
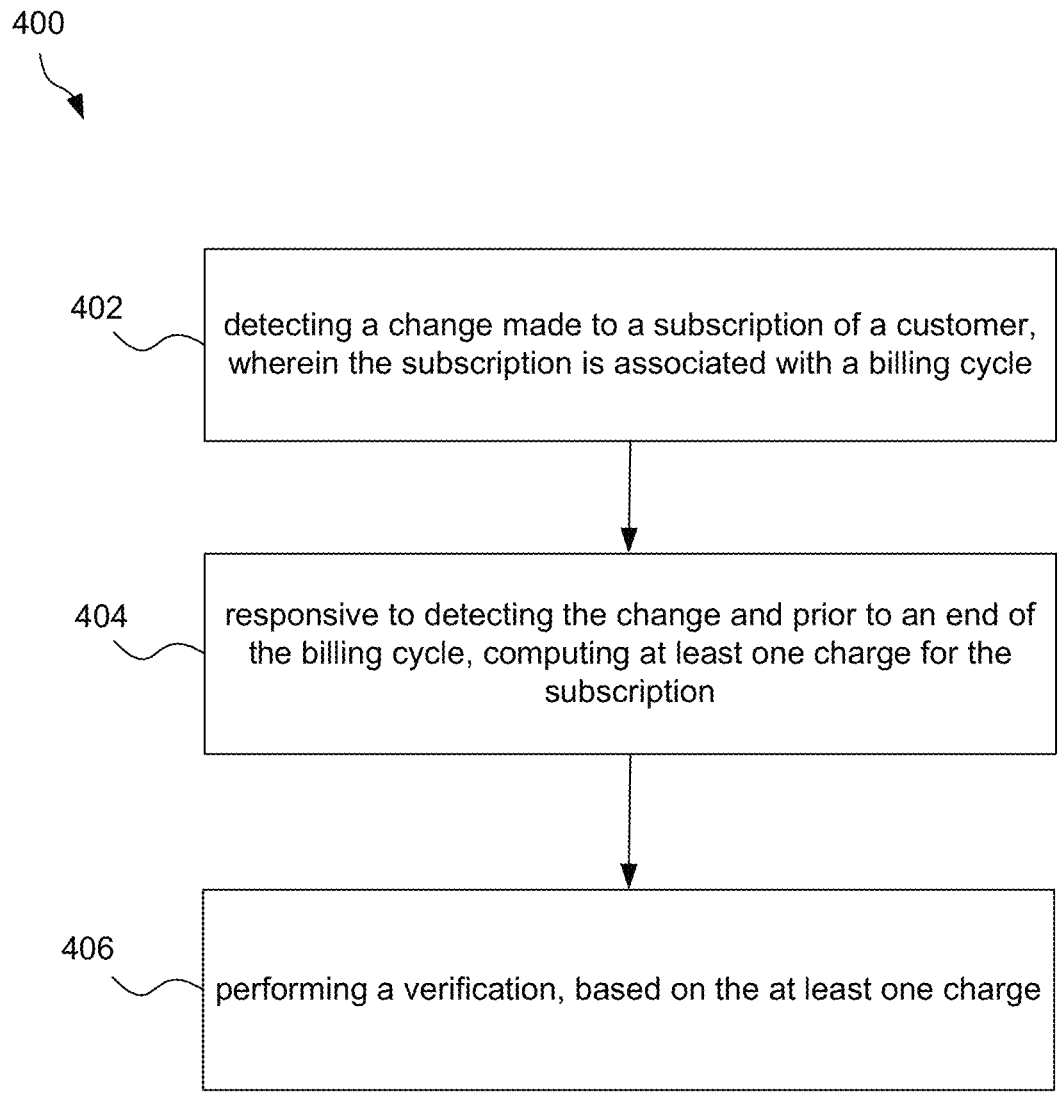
FIG. 4 illustrates a method for performing a verification based on a dynamic charge computation, in accordance with one embodiment.

FIG. 4 illustrates a method 400 for performing a verification based on a dynamic charge computation, in accordance with one embodiment. As an option, the method 400 may be carried out in the context of the details of the previous figure and/or any subsequent figure(s). Of course, however, the method 400 may be carried out in the context of any desired environment. Further, the aforementioned definitions may equally apply to the description below.

One of the key steps in a billing process is validation of the bills for correctness of the calculations. This is a time-consuming process and needs to be executed during the critical time window. Moreover, any issues identified in the calculations will result in fixing of the root cause and regeneration of all the impacted bills, which is a massive undertaking that has a potential to have a domino effect on other bill cycle runs. It is therefore desirable to left shift this process to earlier in the billing cycle so that any anomalies found in the calculations can be identified and fixed much before the billing cycle ends.

The present method 400 provides dynamic charge computations for use in charge verification, to avoid the end-of-cycle peak load caused by performing the charges computation and the verification together at the end of the billing cycle. In operation 402, a change made to a subscription of a customer is detected, wherein the subscription is associated with a billing cycle. Then, in operation 404, responsive to detecting the change and prior to an end of the billing cycle, at least one charge is computed for the subscription.

Further, in operation 406, a verification is performed, based on the computed charge(s). For example, the computed charge(s) may be accumulated with prior charges computed for the subscription during a current billing cycle. Further, the accumulated charges may be verified.

In one embodiment, the accumulated charges may be verified by comparing the accumulated charges to an average charge value determined from prior billing cycles, and detecting a potential error when the accumulated charges deviate from the average charge value by more than a predefined threshold. In another embodiment, the accumulated charges may be verified by comparing the accumulated charges to a consumption pattern predetermined for the subscription, and detecting an anomaly when the accumulated charges deviate from the consumption pattern by more than a predefined threshold.

As another option (not shown), an impact of the change on revenue may be validated. In one embodiment, the impact of the change on revenue may be validated by determining additional charges computed for additional subscriptions for which the same change has been detected (e.g. during the billing cycle), and combining the computed charge(s) with the additional charges to determine the impact of the change on revenue.

To this end, the verification may be implemented in the context of the dynamic charge computations where charges are computed as soon as there is a relevant change, such as a change in a product lifecycle including when any product is added, its characteristics modified, or when the product offer is terminated. With this approach, the charges are always pre-computed in the system (e.g. prior to the end of the billing cycle). There may also be capabilities to fetch the latest accumulated usage information and present the consolidated view of all charges along with associated discounts and taxes. This allows a capability to do quality assurance on the computations of these charges in near real time.

The following are few types of checks that can be done even before the billing cycle ends:

1) Whenever a new offer is introduced in the system, the charges that are computed based on the given offer would be known as soon as the offer is added. This approach allows the system to automatically or manually validate the impact of a newly added/modified offer on the revenue of the CSP even before the billing cycle ends.

2) Any significant deviation in the monthly bill amount from the average value can be detected much before the billing cycle ends. This allows the system to catch the problem way ahead of time and thus reduce the chance of quality assurance failures after the billing cycle ends. In turn, the success rate of the billing cycle is increased.

3) The system tracks the historical consumption patterns of each customer, and can also track any anomalies in the consumption pattern related to total charges and trigger a preemptive quality assurance process whenever some of the predefined thresholds are crossed, thus giving the operator a chance to validate the root cause of the anomaly and if found trigger a notification to the customer to avoid bill shock at the end of the billing cycle.

Figure 5:
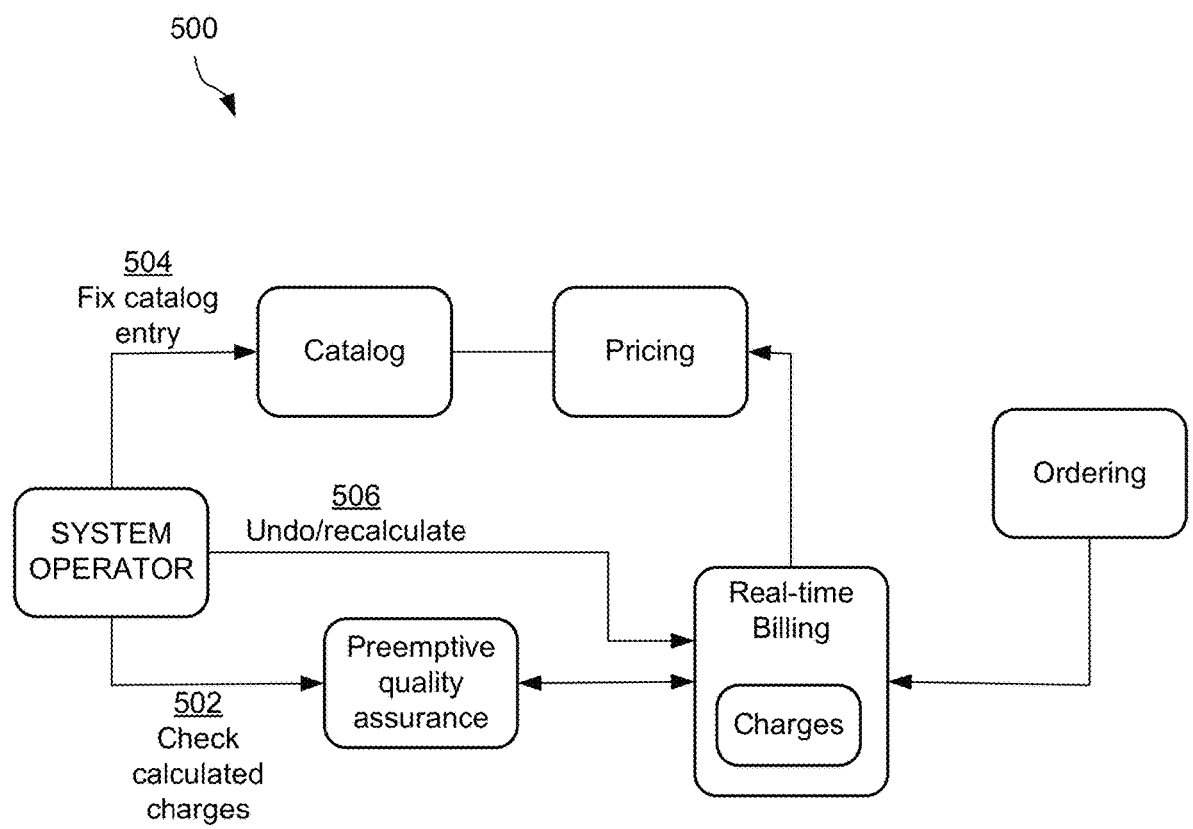
FIG. 5 illustrates a method for performing quality assurance using dynamic charge computations, in accordance with one embodiment.

FIG. 5 illustrates a method 500 for performing quality assurance using dynamic charge computations, in accordance with one embodiment. As an option, the method 500 is an example showing a verification that can be performed using the method 400 of FIG. 4.

In the example shown, the service provider can conduct regular quality assurance throughout the billing cycle and identify issues as soon as they are introduced in the system (see operation 502). This also enables the service provider to find the root cause of the problem related to data errors in catalog entries etc. and fix them well before the billing cycle ends (see operation 504). Also the charges can thus be recomputed with fixed catalog entries and available for further quality checks (see operation 506).

Moreover, by fixing the issue in time and re-computing the impacted population, the wasted computation cycles are reduced for a subsequent population of customers and the impact on end of cycle is reduced. This also reduces the scope of the quality assurance process during the bill cycle thus making it a much faster process. Finally, the verification as described above results in an efficient and successful end-of-cycle process.

CONCLUSION

For postpaid billing systems, the charges are computed after the billing cycle ends. All the computation is done for a customer population (included in a certain billing cycle) during this period. This puts peak load on the system during these heavy computation periods. Due to hardware limitations (availability is not infinite) and a permissible time window for the computation to be completed, there is a finite limit to the size of the customer population for which the bills can be computed thus putting an artificial limit to the size of population supported in a single billing cycle.

In the past, this issue was addressed by increasing the number of billing cycles. However, for certain countries there is a regulation to generate bills on specific calendar days of the month. This forces service providers to have few billing cycles with very large customer populations. Prior techniques tried to address this problem by creating various technical cycles and running them on the same day. But this also has same challenges.

In the embodiments described above, the system aims to minimize the amount of computation done at the end of the cycle. Instead of computing all charges at the end of the cycle, the system computes once when an offer is added and after that the charges are recomputed only when any change is made to the offer. This allows the system to visualize the charges applicable for the billing period at all times, enabling the charge view in near real time. Secondly, whenever the offer is changed or any customer parameter changes which has potential to impact the charges, the system re-computes those charges immediately. This limits the computation of the charge to occur only when there is any change in the offer/parameters of other elements in the system which could have a potential impact.

With this approach, most of the charges pre-computed, and hence only few accumulations are done during an end of cycle process. With this approach, during the end of cycle computation the central processing unit (CPU) processing time per bill is significantly lower, thus allowing the system to handle significantly higher volumes of bills in the same permissible computation window. In this approach, the system also has capabilities to conduct quality assurance of the computed charges before the cycle ends, thus reducing another manual step in the critical end of cycle window.

All these improvements together help the system process significantly high volumes of bills in a single billing cycle, thus providing a very high scalability for the end of cycle process.

Figure 6:
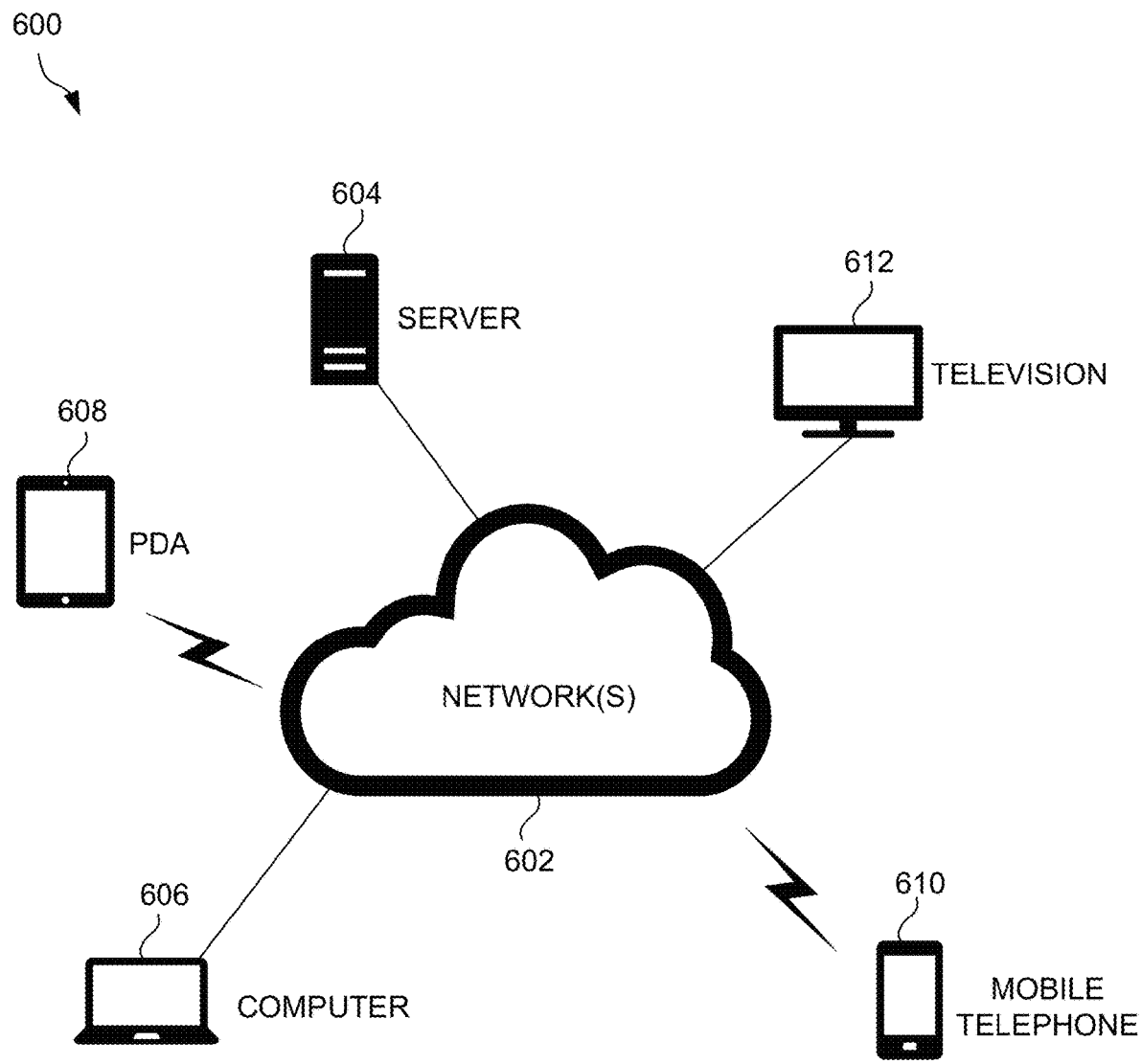
FIG. 6 illustrates a network architecture, in accordance with one possible embodiment.

FIG. 6 illustrates a network architecture 600, in accordance with one possible embodiment. As shown, at least one network 602 is provided. In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 604 and an end user computer 606 may be coupled to the network 602 for communication purposes. Such end user computer 606 may include a desktop computer, lap-top computer, and/or any other type of logic. Still yet, various other devices may be coupled to the network 602 including a personal digital assistant (PDA) device 608, a mobile phone device 610, a television 612, etc.

Figure 7:
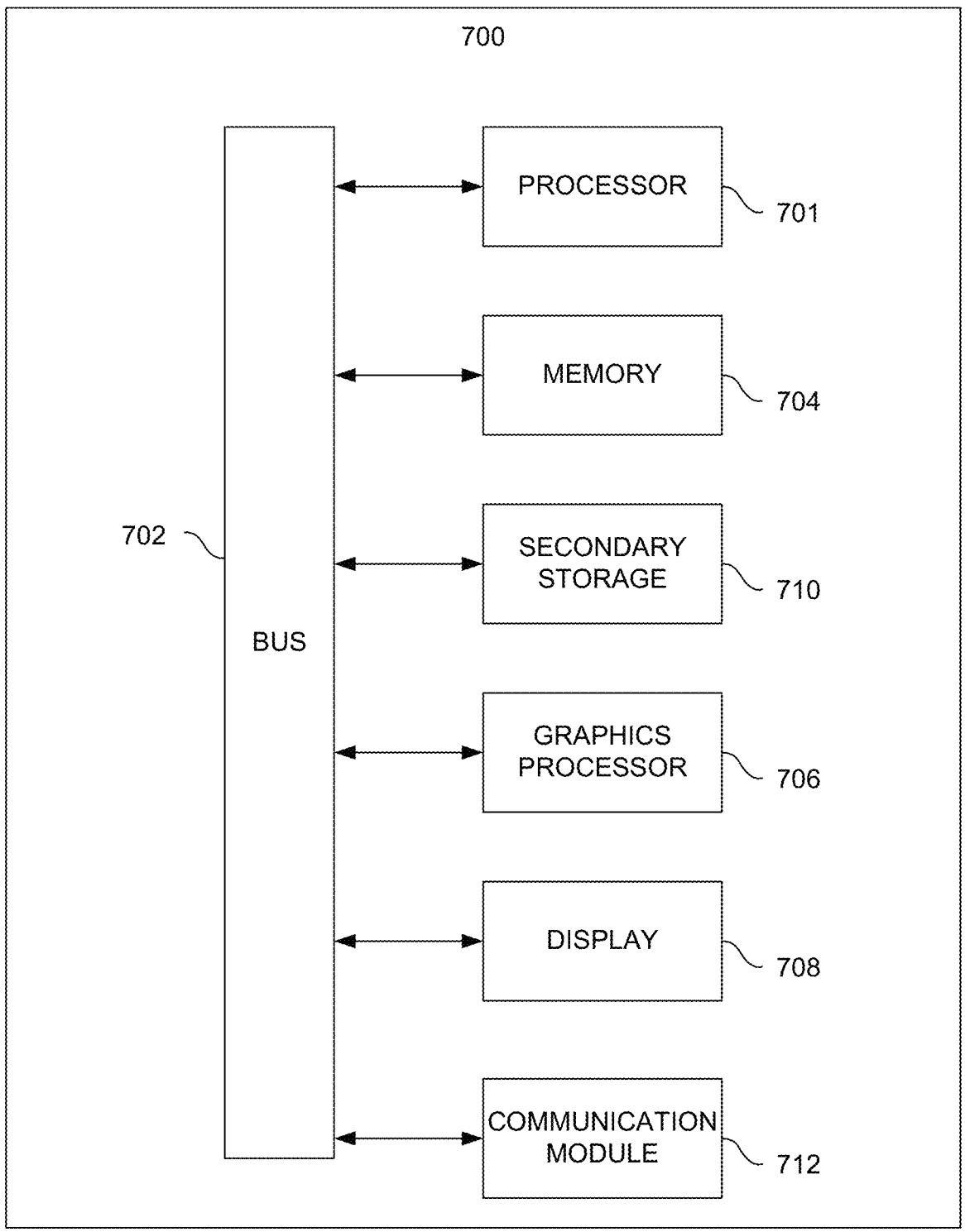
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. Of course, the system 700 may be implemented in any desired environment.

As shown, a system 700 is provided including at least one central processor 701 which is connected to a communication bus 702. The system 700 also includes main memory 704 [e.g. random access memory (RAM), etc.]. The system 700 also includes a graphics processor 706 and a display 708.

The system 700 may also include a secondary storage 710. The secondary storage 710 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 704, the secondary storage 710, and/or any other memory, for that matter. Such computer programs, when executed, enable the system 700 to perform various functions (as set forth above, for example). Memory 704, storage 710 and/or any other storage are possible examples of non-transitory computer-readable media.

The system 700 may also include one or more communication modules 712. The communication module 712 may be operable to facilitate communication between the system 700 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:
   storing subscriptions of customers of a service provider in a computer system, wherein each of the subscriptions of a respective one of the customers is stored based upon acceptance by the respective customer of an offer from the service provider, wherein the offer is to allow use of a service of the service provider by the respective one of the customers in exchange for a recurring fee being paid by the respective one of the customers in accordance with a defined billing cycle schedule;
   for each of the subscriptions:
   (a) during a particular billing cycle defined for the subscription, detecting a change made to the subscription; and
   (b) in real-time of detecting the change made to the subscription and prior to an end of the particular billing cycle:
     computing at least one charge for the change, wherein the at least one charge corresponds to a fee to be included on a bill for the customer at the end of the particular billing cycle, and
     computing additional charges expected for the subscription from a current date through an end of the particular billing cycle, wherein the additional charges represent a portion of unbilled revenue that corresponds to the subscription;
   at the end of a revenue cycle of the service provider, accumulating the additional charges computed for the subscriptions, wherein the accumulated additional charges represent unbilled revenue of the service provider at the end of the revenue cycle, wherein the end of the revenue cycle does not coincide with the end of the particular billing cycle defined for at least one of the subscriptions.

2. The non-transitory computer readable medium of claim 1, further comprising:
   monitoring a system utilized for managing the subscriptions;
   wherein the change is detected based on the monitoring.

3. The non-transitory computer readable medium of claim 1, wherein the change includes an addition of a new offer to the subscription.

4. The non-transitory computer readable medium of claim 1, wherein the change includes a modification of the offer associated with the subscription.

5. The non-transitory computer readable medium of claim 1, wherein the change includes a deletion of the offer associated with the subscription.

6. The non-transitory computer readable medium of claim 1, wherein the change includes a modification to one or more customer parameters included in the subscription.

7. The non-transitory computer readable medium of claim 1, further comprising, for each of the subscriptions:
   (c) accumulating the charge with prior charges computed for the subscription during the particular billing cycle.

8. The non-transitory computer readable medium of claim 7, further comprising, for each of the subscriptions:
   (d) verifying the accumulated charges.

9. The non-transitory computer readable medium of claim 8, wherein the accumulated charges are verified by:
   comparing the accumulated charges to an average charge value determined from prior billing cycles, and
   detecting a potential error when the accumulated charges deviate from the average charge value by more than a predefined threshold.

10. The non-transitory computer readable medium of claim 8, wherein the accumulated charges are verified by:
    comparing the accumulated charges to a consumption pattern predetermined for the subscription, and
    detecting an anomaly when the accumulated charges deviate from the consumption pattern by more than a predefined threshold.

11. The non-transitory computer readable medium of claim 1, further comprising for each of the subscriptions:
    (d) validating an impact of the change on revenue.

12. The non-transitory computer readable medium of claim 11, wherein the impact of the change on revenue is validated by:
  determining additional charges computed for one or more other subscriptions for which the change is detected, and
  combining the charge with the additional charges to determine the impact of the change on revenue.

13. The non-transitory computer readable medium of claim 1, wherein the a plurality of different billing cycles are defined for the subscriptions.

14. The non-transitory computer readable medium of claim 1, further comprising for each of the subscriptions:
  (d) performing quality assurance during the particular billing cycle by verifying the charge during the particular billing cycle.

15. A method, comprising:
  storing subscriptions of customers of a service provider in a computer system, wherein each of the subscriptions of a respective one of the customers is stored based upon acceptance by the respective customer of an offer from the service provider, wherein the offer is to allow use of a service of the service provider by the respective one of the customers in exchange for a recurring fee being paid by the respective one of the customers in accordance with a defined billing cycle schedule;
  for each of the subscriptions:
  (a) during a particular billing cycle defined for the subscription, detecting a change made to the subscription; and
  (b) in real-time of detecting the change made to the subscription and prior to an end of the particular billing cycle:
    computing at least one charge for the change, wherein the at least one charge corresponds to a fee to be included on a bill for the customer at the end of the particular billing cycle, and
    computing additional charges expected for the subscription from a current date through an end of the particular billing cycle, wherein the additional charges represent a portion of unbilled revenue that corresponds to the subscription;
  at the end of a revenue cycle of the service provider, accumulating the additional charges computed for the subscriptions, wherein the accumulated additional charges represent unbilled revenue of the service provider at the end of the revenue cycle, wherein the end of the revenue cycle does not coincide with the end of the particular billing cycle defined for at least one of the subscriptions.

16. A system, comprising:
  a non-transitory memory storing instructions; and
  one or more processors in communication with the non-transitory memory that execute the instructions to perform a method comprising:
  storing subscriptions of customers of a service provider in a computer system, wherein each of the subscriptions of a respective one of the customers is stored based upon acceptance by the respective customer of an offer from the service provider, wherein the offer is to allow use of a service of the service provider by the respective one of the customers in exchange for a recurring fee being paid by the respective one of the customers in accordance with a defined billing cycle schedule;
  for each of the subscriptions:
  (a) during a particular billing cycle defined for the subscription, detecting a change made to the subscription; and
  (b) in real-time of detecting the change made to the subscription and prior to an end of the particular billing cycle:
    computing at least one charge for the change, wherein the at least one charge corresponds to a fee to be included on a bill for the customer at the end of the particular billing cycle, and
    computing additional charges expected for the subscription from a current date through an end of the particular billing cycle, wherein the additional charges represent a portion of unbilled revenue that corresponds to the subscription;
  at the end of a revenue cycle of the service provider, accumulating the additional charges computed for the subscriptions, wherein the accumulated additional charges represent unbilled revenue of the service provider at the end of the revenue cycle, wherein the end of the revenue cycle does not coincide with the end of the particular billing cycle defined for at least one of the subscriptions.

17. The system of claim 16, wherein the system is a billing system of the service provider providing the service to which the customer subscribes.

* * * * *